United States Patent
Howard, Jr. et al.

[11] Patent Number: 5,392,568
[45] Date of Patent: Feb. 28, 1995

[54] RANDOM ORBIT SANDER HAVING BRAKING MEMBER

[75] Inventors: Thomas J. Howard, Jr., Whitehall; David L. Sutton, Forest Hill, both of Md.

[73] Assignee: Black & Decker Inc., Newark, Del.

[21] Appl. No.: 173,644

[22] Filed: Dec. 22, 1993

[51] Int. Cl.⁶ .............................................. B24B 23/00
[52] U.S. Cl. ..................................... 451/357; 451/344
[58] Field of Search .......... 51/170 MT, 170 R, 170 J, 51/174, 177; 188/379, 380, 378

[56] References Cited

U.S. PATENT DOCUMENTS

| | | |
|---|---|---|
| 1,800,341 | 4/1931 | Davies . |
| 2,639,564 | 5/1953 | Atkin . |
| 2,942,384 | 6/1960 | Higley . |
| 4,145,848 | 1/1974 | Hutchins . |
| 4,322,921 | 4/1982 | Maier . |
| 4,531,329 | 7/1985 | Huber . |
| 4,660,329 | 4/1987 | Hutchins . |
| 4,727,682 | 3/1988 | Stabler et al. . |
| 4,729,195 | 3/1988 | Berger . |
| 4,754,575 | 7/1988 | Schneider . |
| 4,759,152 | 7/1988 | Berger et al. . |
| 5,018,314 | 5/1991 | Fushiya et al. . |
| 5,261,190 | 11/1993 | Berger et al. . |

FOREIGN PATENT DOCUMENTS

| | | |
|---|---|---|
| 0230621 | 8/1987 | European Pat. Off. . |
| 0254850 | 2/1988 | European Pat. Off. . |
| 0138278 | 6/1988 | European Pat. Off. . |
| 0320599 | 6/1989 | European Pat. Off. . |
| 0559020 | 9/1993 | European Pat. Off. . |
| 1189405 | 11/1965 | Germany . |
| 7346228 | 7/1974 | Germany . |
| 3533668 | 3/1987 | Germany . |
| 3625671 | 1/1988 | Germany . |
| 3625535 | 2/1988 | Germany . |
| 4023464 | 1/1992 | Germany . |
| 2191429 | 5/1990 | United Kingdom . |
| 8501004 | 3/1985 | WIPO ................................. 52/170 R |
| 8804218 | 6/1988 | WIPO . |
| 8909114 | 10/1989 | WIPO . |
| 9009869 | 9/1990 | WIPO . |

*Primary Examiner*—Maurina T. Rachuba
*Attorney, Agent, or Firm*—Harness, Dickey & Pierce

[57] ABSTRACT

A random orbit sander having a braking member for frictionally controlling the speed of a platen of the sander when the sander is removed from a workpiece during operation. The braking member includes a base portion, an outwardly flaring, relatively thin wall portion and an enlarged outermost edge portion adapted to frictionally engage an upper surface of the platen. The braking member is secured to the bottom of the shroud of the housing via a groove formed in its base portion. The braking member exerts a relatively constant spring force against the upper surface of the platen which limits the rotational speed of the platen to approximately 1200 rpm when the platen is lifted off of a work surface, without significantly degrading the performance of the sander under load. This prevents swirl marks and other undesirable scratches from being made in a workpiece when the platen is reapplied to the workpiece as a result of the platen having increased in speed to an unloaded, free-wheeling speed, and yet allows the platen to operate at or above the minimum desired working speed of about 800 rpm. The braking member is formed from polyester butylene terephthalate which is doped with approximately 2% silicon and approximately 15% teflon in the preferred embodiments. This material formulation, plus its geometry, allows the braking member to exert and maintain a relatively constant spring force of about 3.5 lbs. against the platen and to resist frictional wear once past an initial break-in period. The braking member also acts as a seal between the lower surface of the shroud and the upper surface of the platen.

19 Claims, 3 Drawing Sheets

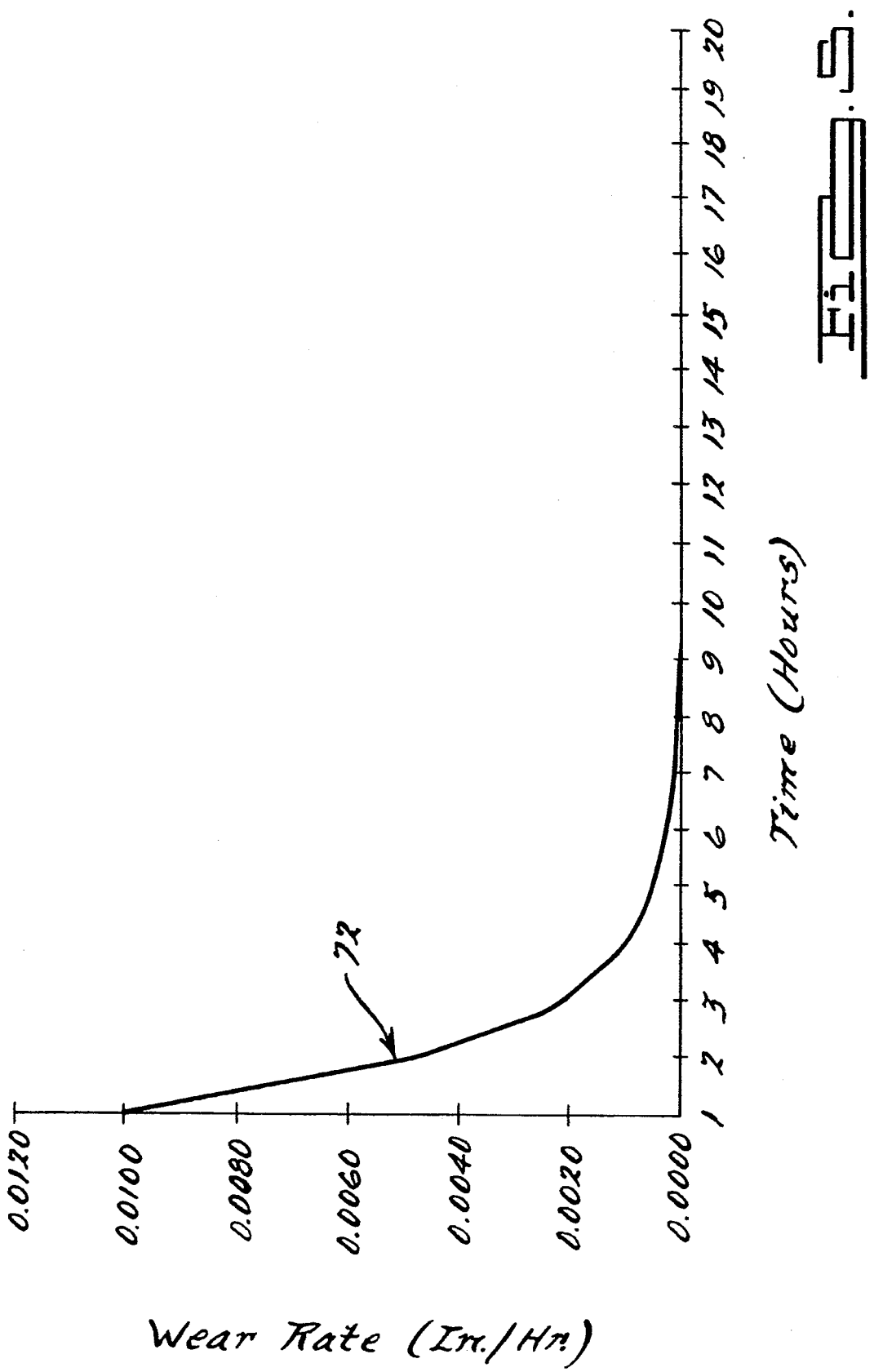

RANDOM ORBIT SANDER HAVING BRAKING MEMBER

BACKGROUND OF THE INVENTION

1. Technical Field

This invention relates to random orbital sanders, and more particularly to a random orbital sander having an annular member which acts as a brake on a platen of the sander to control the speed of the platen when the platen is lifted off of a work surface during operation of the sander.

2. Discussion

Random orbital sanders are used in a variety of applications where it is desirable to obtain an extremely smooth surface free of scratches and swirl marks. Such applications typically involve wood working applications such as furniture construction or vehicle body repair applications, just to name a few. In either of these applications it is imperative that the work surface be free of scratches and/or swirl marks before the surface is painted or otherwise coated with some form of finish sealer or stain.

Prior developed random orbital sanders typically include a platen which is driven rotationally by a motor-driven spindle within the sander. The platen is driven via a freely rotatable bearing that is eccentrically mounted on the end of the drive spindle. Rotation of the drive spindle causes the platen to orbit about the drive spindle while frictional forces within the bearing, as well as varying frictional loads on the sanding disc attached to the platen, cause the platen to also rotate about the eccentric bearing, thereby imparting the "random" orbital movement to the platen.

Typically such random orbit sanders also include a fan member which is driven by the output shaft of the motor. The fan member is adapted to draw dust and debris generated by the sanding action up through openings formed in the platen and into a filter or other like dust collecting receptacle. However, since at least some small degree of clearance must be left between the bottom housing or shroud of the sander and the upper surface of the platen to provide unimpeded rotational movement of the platen relative to the housing, this reduces the suction force that can be generated through the openings in the platen. Consequently, the ability of the fan to draw dust directly off of the work surface and through the openings in the platen is reduced.

However, a problem with most prior random orbit sanders is that the operator must be extremely careful not to gouge or mar the surface of the workpiece when the sander is applied to the workpiece. In particular, because the rotational speed of the platen varies with loading, when the platen is lifted off of the work surface the platen tends to spin up to an unloaded or "free wheeling" speed approximately equal to the rotational speed of the drive spindle, which may, for example, be as high as 12,000 rpm. Consequently, when the sanding disc is reapplied to the workpiece, the platen undergoes rapid deceleration, causing the sander to "jump" around on the workpiece until the rotational speed of the platen is reduced below approximately 1200 rpm. Accordingly, once the sander has been removed from the workpiece, it is difficult for the operator to gradually reapply the sander to the workpiece without the sander jumping and scratching the work surface.

Various attempts have been made to overcome this problem. For example, it has been proposed to provide a planetary gearing mechanism between the drive spindle and the platen to control the rotational speed of the platen. However, this approach adds complexity and is costly. Additionally, it has been proposed to include a spring-mounted braking member that is biased against the platen to frictionally control the speed of the platen. However, such devices, while also adding cost, tend to cause excessive wear of the platen and can have the undesirable effect of reducing the rotational speed of the platen below its minimum effective operating speed when loaded. Moreover, frictional wear can also reduce the axial dimension of the braking component significantly over many hours of use which, in turn, reduces the spring force, or braking force, which the component can exert on the platen. Accordingly, such components have not been able to provide the relatively constant braking force needed, over many hours of use, to provide consistent speed control over the platen. Exacerbating this problem is the varying types of abrasive particulate matter which the sander is inevitably exposed to. This further accelerates the wear of the braking component and platen and contributes to the degradation in the braking force of such frictional braking components.

Thus, it is highly desirable to control the speed of the platen when the platen is lifted off of a work surface while allowing the platen to rotate at a speed of at least about 800 rpm when being applied to the work surface. Controlling the speed of the platen by preventing it from exceeding about 1200 rpm allows the sander to be lifted off of and reapplied to the work surface without marring the work surface and thus enhancing the sanding operation. It is further highly desirable to provide this control via a single, relatively inexpensive frictional braking component which is resistant to frictional wear.

It is therefore a principal object of the present invention to provide a brake member for a random orbit sander which serves to allow the platen of such a sander to rotate at a speed of at least about 800 rpm while the platen is being applied to a work surface, and yet which serves to provide a frictional "braking" action to the platen when the platen is lifted off of the work surface so as to limit the rotational speed of the platen to a predetermined upper limit.

It is yet another object of the present invention to provide a braking member for a random orbit sander which serves to effectively seal the small distance between the upper surface of the platen and the lower surface of the housing to thus cause the full suction force generated by the fan to draw sanding dust up through openings in the platen, to thereby remove such dust directly from the work surface being sanded.

It is still another object of the present invention to provide a braking member for a random orbit sander which serves to provide a relatively constant braking force to a platen of the sander, and which does not wear appreciably due to frictional contact with the platen, after an initial break-in period.

It is still another object of the present invention to provide a braking member for a random orbit sander which provides a relatively constant braking force to the platen which is generally unaffected by the form of sanding dust from the work surface being sanded.

It is still another object of the present invention to provide a braking member for a random orbit sander which may be relatively easily retrofitted to many existing sanders without major structural modifications to the braking member itself or to the housing of the sander.

SUMMARY OF THE INVENTION

The above and other objects are provided by a random orbit sander having a braking member for frictionally controlling the speed of a platen of the sander, in accordance with preferred embodiments of the invention. The braking member is generally comprised of an integrally formed annular member which is secured to a lower surface of the housing of the sander so as to be interposed between the lower surface and an upper surface of the platen. The braking member includes a base portion adapted to be secured to a portion of the lower surface of the housing, a flexible wall portion flaring outwardly of the base portion and an outer edge portion adapted to ride on a portion of the upper surface of the platen during rotation of the platen.

In the preferred embodiments the braking member is formed from a material which allows a degree of flexing of the wall portion so as to exert a spring force of between 3 lbs. and 4 lbs. to the upper surface of the platen. The material preferably comprises polyester butylene terephthalate which is also preferably doped with silicon and teflon. This composition provides the braking member with a flex modulus within a preferred range of about 35 to 75 kpsi and results in a small degree of permanent deformation of the braking member occurring during an initial break-in period. After this break-in period the braking member experiences no appreciable wear or other deformation.

During operation the braking member frictionally engages the upper surface of the platen and exerts a braking force of between about 3 and 4 lbs., which does not appreciably affect the operation of the sander under normal loading conditions. However, when the sander is lifted off of the work surface, the braking force serves to limit the rotational speed of the platen to about 1000 rpm to 1200 rpm. Thus, when the platen is reapplied to the work surface, the sander does not jump and scar or gouge the work surface. Accordingly, by controlling the speed of the platen at all times so that it does not exceed about 1200 rpm, the braking member serves to substantially eliminate the undersirable jumping or grabbing which can otherwise occur with a conventional random orbit sander.

The braking member provides the additional advantage of acting as a seal to seal the area between the lower surface of the housing and the upper surface of the platen. Thus, the fan of the sander is caused to direct its full suction force to the openings in the platen which allows dust and other particulate matter to be more efficiently drawn up through the openings directly off of the work surface and into the dust canister. The materials used to form the braking member cause the braking member to remain generally free of frictional wear, after the initial break-in period, even when exposed to varying forms of sanding dust which would otherwise significantly accelerate its wear.

In one preferred embodiment an optional metallic, and preferably stainless steel, ring is secured to the upper surface of the platen upon which the outer edge portion of the braking member rides. While optional, the stainless steel ring serves to help limit the wear to the upper surface of the platen over extended periods of use.

BRIEF DESCRIPTION OF THE DRAWINGS

The various advantages of the present invention will become apparent to one skilled in the art by reading the following specification and subjoined claims and by referencing the following drawings in which:

FIG. 5 is a graph illustrating the typical rate of wear of the braking member over time.

DETAILED DESCRIPTION OF THE PREFERRED EMBODIMENT

Figure 1:
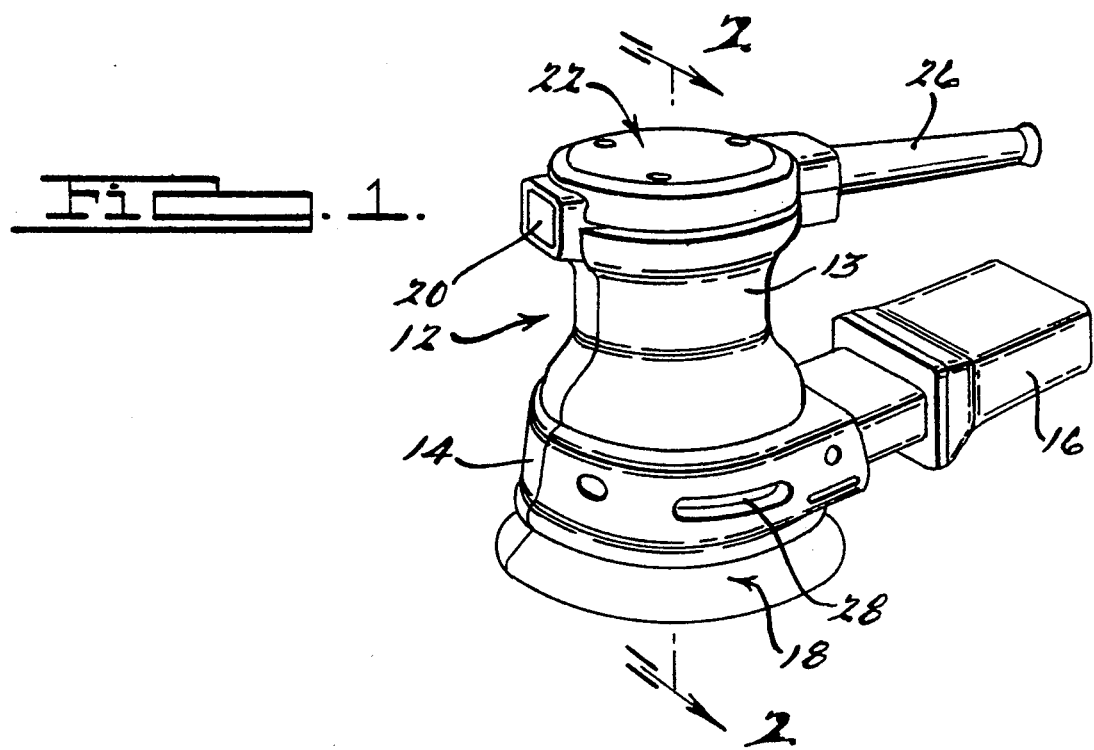
FIG. 1 is a perspective view of a random orbit sander in accordance with preferred embodiments of the present invention.

Referring to FIG. 1, a random orbit sander 10 in accordance with a preferred embodiment of the present invention is shown. The sander generally includes a housing 12 which includes a two-piece upper housing section 13 and a two-piece shroud 14 at a lower end thereof. Removably secured to the shroud 14 is a dust canister 16 for collecting dust and other particulate matter generated by the sander during use. A platen 18 having a piece of sand paper 19 releasably adhered thereto is disposed beneath the shroud 14. The platen 18 is adapted to be driven rotationally and in a random orbital pattern by a motor disposed within the upper housing 13. The motor (shown in FIG. 2) is turned on and off by a suitable on/off switch 20 which can be controlled easily with a finger of one hand while grasping the upper end portion 22 of the sander. The upper end portion 22 further includes an opening 24 formed circumferentially opposite that of the switch 20 through which a power cord 26 extends.

The shroud 14 is preferably rotatably coupled to the upper housing section 13 so that the shroud 14, and hence the position of the dust canister 16, can be adjusted for the convenience of the operator. The shroud section 14 further includes a plurality of openings 28 (only one of which is visible in FIG. 1) for allowing a cooling fan driven by the motor within the sander to expel air drawn into and along the interior area of the housing 12 to help cool the motor.

Figures 2, 3:
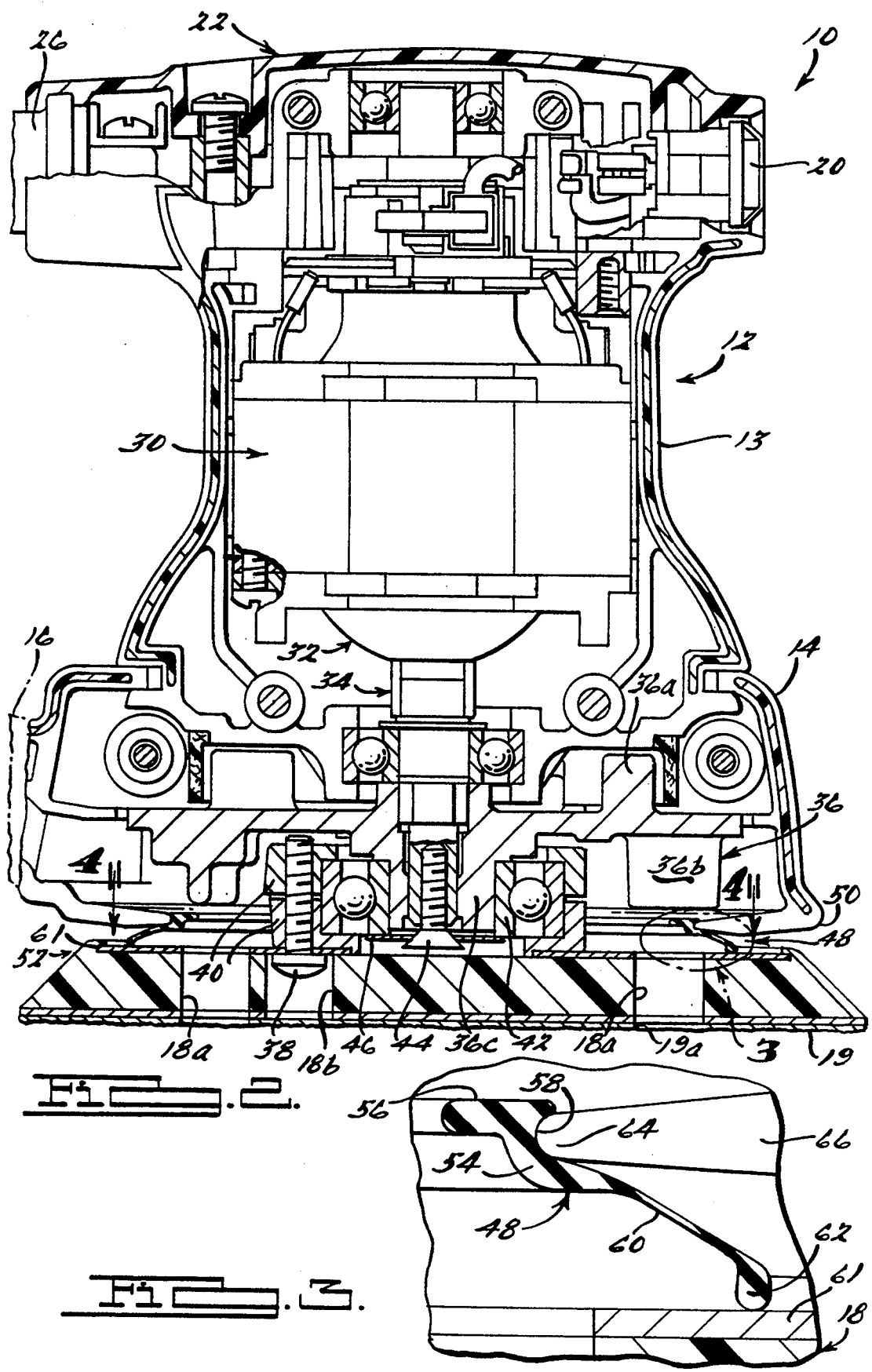
FIG. 2 is a cross sectional side view of the sander of FIG. 1 taken in accordance with section line 2—2 in FIG. 1.
FIG. 3 is an enlarged fragmentary view of a portion of the braking member, shroud and platen in accordance with circled area 3 in FIG. 2.

With reference now to FIG. 2, the motor can be seen and is designated generally by reference numeral 30. The motor 30 includes an armature 32 having an output shaft 34 associated therewith. The output shaft or drive spindle 34 is coupled to a combined motor cooling and dust collection fan 36. In particular, fan 36 comprises a disc-shaped member having impeller blades formed on both its top and bottom surfaces. The impeller blades 36a formed on the top surface serve as the cooling fan for the motor, and the impeller blades 36b formed on the bottom surface serve as the dust collection fan for the dust collection system. Openings 18a formed in the platen 18 allow the fan 36b to draw sanding dust up through aligned openings 19a in the sandpaper 19 into the dust canister 16 to thus help keep the work surface clear of sanding dust. The platen 18 is secured to a bearing retainer 40 via a plurality of threaded screws 38 (only one of which is visible in FIG. 2) which extend through openings 18b in the platen 18. The hearing retainer 40 carries a bearing 42 that is journalled to an eccentric arbor 36c formed on the bottom of the fan member 36. The bearing assembly is secured to the arbor 36c via a threaded screw 44 and a washer 46. It will be noted that the bearing 42 is disposed eccentrically to the output shaft 34 of the motor, which thus imparts an orbital motion to the platen 18 as the platen 18 is driven rotationally by the motor 30.

With further reference to FIG. 2, a braking member 48 in accordance with the present invention is illustrated and disposed between a lower surface 50 of the shroud 14 and an upper surface 52 of the platen 18. The braking member 48 comprises an annular ring-like sealing member which effectively seals the small axial distance between the lower surface 50 of the shroud 14 and the upper surface 52 of the platen 18, which typically is on the order of 3 mm ±0.7 mm. This sealing feature will subsequently be described in greater detail.

With reference to FIG. 3, the braking member 48 includes a base portion 54 having a generally planar upper surface 56, a groove 58 formed about the outer circumference of the base portion 54, a flexible, outwardly flaring wall portion 60 having a cross sectional thickness of preferably about 0.15 mm, and an enlarged outermost edge portion 62. The groove 58 engages an edge portion 64 of an inwardly extending lip portion 66 of the shroud 14 which secures the braking member 48 to the lip portion 66. In FIGS. 2 and 3, the outermost edge portion 62 is illustrated as riding on an optional metallic, and preferably stainless steel, annular ring 61 which is secured to the backside 52 of the platen 18. Alternatively, the entire backside of the platen 18 may be covered with a metallic or stainless steel sheet. While optional, the stainless steel annular ring or sheet 61 serves to substantially eliminate the wear that might be experienced on the upper surface 52 of the platen 18 if the outermost edge portion 62 were to ride directly thereon.

Figure 4:
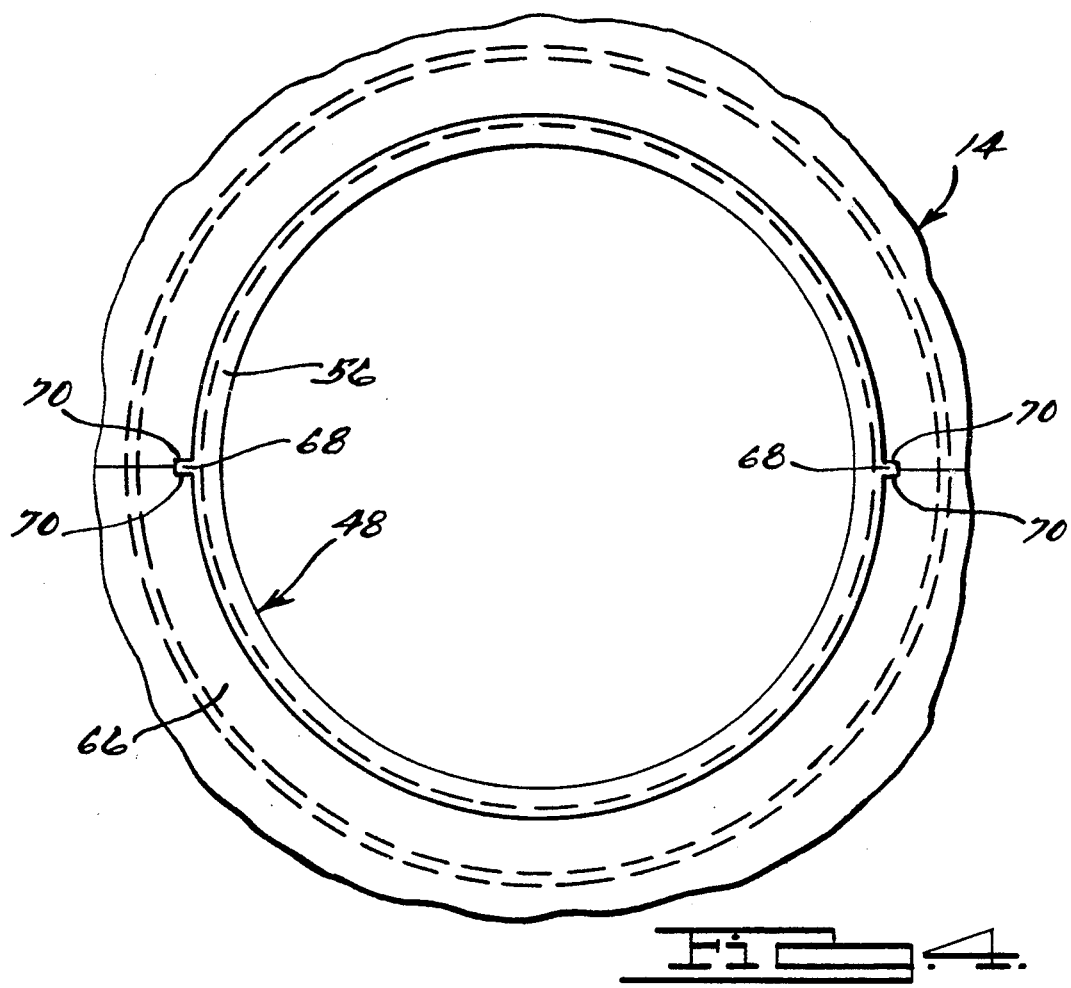
FIG. 4 is a plan view of the braking member showing how same is secured to the shroud of the housing of the sander, in accordance with section line 4—4 in FIG. 2.

With brief reference to FIG. 4, the braking member 48 further includes a pair of radially opposed tabs 68 which engage notched recesses 70 in the inwardly extending lip portion 66 of the shroud 14. This prevents the braking member 48 from rotating with the platen 18 relative to the shroud 14 during operation of the sander 10. The braking member 48 is formed by injection molding as a single component from a material which allows a degree of flexure of the wall portion 60, and preferably from polyester butylene terephthalate (hereinafter "PBT").

With reference to FIGS. 2 and 3, the operation of the braking member 48 during use of the sander 10 will now be described. As the platen 18 is driven rotationally by the output shaft 34 of the motor 30, the outermost edge portion 62 of the braking member 48 rides frictionally over the upper surface 52 of the platen 18. The outermost edge portion 62 of the braking member 48 exerts a relatively constant, small downward spring force onto the stainless steel ring 61. The spring force is such that the random orbital action of the platen 18 is substantially unaffected under normal loading conditions, but the rotational speed of the platen 18 is limited when the platen 18 is lifted off of the work surface to about 1200 rpm. It has been determined that an operating speed of at least about 800 rpm is desirable to prevent the formation of swirl marks on the surface of the workpiece when the platen is loaded. Thus, 800 rpm represents a preferred lower speed limit which the braking member 48 must allow the platen 18 to attain when engaged with a work surface during normal operation to achieve satisfactory sanding performance. It has further been determined that if the platen is permitted when unloaded to attain rotational speeds substantially above normal operating speeds-e.g., above approximately 1200 rpm-the rapid deceleration that results when the platen is reapplied to the workpiece causes the sander 10 to jump which can produce undesirable gouges or scratches in a work surface. Thus, it is desirable for the braking member 48 to prevent the rotational speed of the platen 18 about bearing 42 to exceed approximately 1200 rpm when the platen 18 is unloaded, and permit the platen 18 to rotate above approximately 800 rpm when loaded.

To achieve the desired braking action the braking member 48 exerts a relatively constant preferred braking force of about 3.5 lbs. onto the stainless steel ring 61 at all times during operation of the sander 10. This degree of braking force is significantly less than the frictional torque imposed by the interface of the sandpaper 19 secured to the platen 18 and the workpiece, but of the same order of magnitude as the torque applied by the bearing 42. Consequently, the brake member 48 has an insignificant effect on the normal operation of the platen when under load, and a speed limiting effect on the platen when unloaded.

The desired braking force of about 3.5 lbs. is achieved by the combination of the geometry of the braking member 48 as well as the material used in its formation. It has been found that the use of PBT doped with about 2% silicon and about 15% teflon provides a preferred flex modulus of about 46.5 kpsi. However, a material which provides a flex modulus anywhere within about 35 kpsi to 75 kpsi should be suitable to provide the desired degree of flexure to the brake member 48. The amount of braking force generated by the braking member 48 is important because a constant braking force in excess of about 4 lbs. causes excessive wear at the outermost edge portion 62, while a braking force of less than about 3 lbs. is too small to appropriately limit the increase in rotational speed of the platen 18 when the platen 18 is lifted off of a work surface.

With further reference to FIG. 3, the relatively thin cross-section of the wall portion 60, in addition to the material used in the construction of the braking member 48, allows the wall portion 60 to take a "set" after an initial period of use of about six to eight hours of the sander 10. By "set" it is meant that a small degree of material actually "flows", thus causing a distortion in the shape of the brake member 48 evident by a slight decrease in the overall axial length of the braking member 48 after the initial break-in period. Thus, a permanent deformation of the braking member 48 occurs once the member 48 takes a set. Importantly, the relatively thin wall portion 60 enables the brake member 48 to exert a relatively constant spring force over a range of axial heights. In this manner the brake member 48 can accommodate the variations due to manufacturing tolerances in the size of the gap between the shroud and the platen and still achieve the desired 3.5 lbs. spring force.

After the initial break-in period of six to eight hours, the wear of the braking member 48 becomes virtually non-existent. This is illustrated by the graph of FIG. 5, which depicts the wear rate in terms of the reduction in the overall axial length of the braking member 48 versus the total time of operation of the sander 10. The curve 72 illustrates that during about the first eight hours of use the wear rate, in inches per hour, of the braking member 48 is significant. However, after this initial period during which time the brake material takes its set, the change in the axial dimension of the braking member 48 due to wear is virtually nonexistent. Accordingly, the axial length of the braking member 48 stays substantially the same after the initial eight hour break-in.

With further reference to FIG. 2, the braking member 48 also performs the additional function of acting as a seal to close off the axial gap between the lower surface 50 of the shroud 14 and the upper surface 52 of the platen 18. This serves to increase the suction force through the openings 18a in the platen 18 and thus to enhance the ability of the fan 36 to draw sanding dust directly off of the work surface and into the dust canister 16. It should also be noted that the formulation of material described herein for the braking member 48 provides a degree of "lubricity" to the material. This helps to enable the braking member 48 to maintain a relatively constant braking force of about 3.5 lbs. on the platen 18 despite a relatively wide range in the frictional coefficient between the outermost edge portion 62 and the stainless steel ring 61 of the platen 18 caused by varying types of workpiece dust contamination.

Furthermore, the material and geometry of the braking member 48 allow it to control the speed of the platen 18 in the manner described despite the increased pressure generated by the fan 36, which tends to cause the outermost edge portion 62 to be forced against the stainless steel ring 61. The material properties and geometry of the braking member 48 are similarly not adversely affected by the variation in suction force which results as the dust canister 16 fills with dust during use of the sander 10. Moreover, the flexibility imparted to the wall portion 60 by the material formulation and its geometry reduces, as noted, the criticality that the axial dimension of the gap between the lower surface 50 of the shroud 14 and the upper surface 52 of the platen 18 be held to within extremely close tolerances. Thus, a slight variation in this gap will not adversely affect the braking force provided by the braking member 48.

The simplicity of the configuration of the braking member 48 further enhances the ease with which the braking member can be adapted to fit existing random orbit sanders.

The braking member 48 thus functions to control the rotational speed of the platen 18 in the manner described and also to seal the gap that exists between the lower surface 50 of the shroud 14 and the upper surface 52 of the platen 18. Furthermore, the material formulation of the braking member 48 is such as to allow it to maintain a relatively constant spring force on the platen, and to substantially resist further wear after an initial break-in period.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A random orbit sander having a motor, a platen driven rotationally by said motor and spaced axially apart from a lower surface of a housing of said sander, the improvement comprising:
   brake means comprising a flexible annular seal that is secured to the lower surface of the housing and frictionally engaged to an upper surface of said platen for controllably, frictionally braking said platen to maintain the rotational speed of said platen within a predetermined range when said platen is lifted off of a work surface during operation of said sander, and for sealing the axial gap between the lower surface of the housing and said platen;
   said brake means including a base portion adapted to be secured to said housing, a flexible, flaring wall portion protruding from said base portion, and an outer edge portion having a thickness greater than said wall portion for contacting said upper surface of said platen.

2. The sander of claim 1, wherein said annular seal is formed from polyester butylene terephthalate doped with silicon and teflon.

3. The sander of claim 2 wherein said doping of said polyester butylene terephthalate comprises about two percent silicon and about fifteen percent teflon.

4. The apparatus of claim 1, wherein said brake means provides a braking spring force of approximately three to four lbs.

5. A random orbit sander comprising a motor, a platen driven rotationally by said motor and spaced axially apart from a lower surface of a housing of said sander, the platen having at least one opening therethrough, a fan for drawing dust and particulate matter through said opening, and braking means for controllably, frictionally braking said platen to control the rotational speed of said platen when said platen is lifted off of a work surface during operation of said sander without significantly degrading the performance of the sander under load;
   said braking means further forming an annular seal comprising:
   a base portion adapted to be secured to said lower surface of said housing,
   a flexible wall portion extending from said base portion, and
   an outer edge portion adapted to frictionally contact said upper surface of said platen, said braking means operating to limit the rotational speed of said platen to approximately 1200 rpm when said platen is lifted off of said work surface and to increase the suction force through said opening in said platen by forming a peripheral seal between said lower surface of said housing and said upper surface of said platen.

6. The sander of claim 5, wherein said upper surface of said platen includes a metallic ring secured thereto upon which said outer edge portion of said braking means rides during rotation of said platen.

7. The sander of claim 5, wherein said flexible wall portion has a relatively thin cross section and is adapted to permanently deform after an initial period of use of said sander.

8. The sander of claim 5, wherein said braking means is formed from polyester butylene terephthalate doped with silicon and teflon.

9. The sander of claim 8, wherein said silicon comprises approximately two percent and said teflon comprises approximately fifteen percent of said doping of said polyester butylene terephthalate.

10. The sander of claim 5, wherein said braking means provides a relatively constant spring force of approximately 3.5 lbs. against said upper surface of said platen.

11. The sander of claim 5, wherein said braking means is constructed of a material having a flex modulus within a range of approximately 35 kpsi to approximately 75 kpsi.

12. A random orbit sander comprising a motor, a platen driven rotationally by said motor and spaced axially apart from a lower surface of a housing of said sander, and a braking member interposed between the lower surface of the housing and an upper surface of the platen for controllably, frictionally engaging said upper surface of said platen to thereby effect a braking action on the rotation of said platen to limit the rotational speed of said platen when said platen is lifted off of a work surface during operation of said sander without significantly degrading the performance of the sander under load;

said braking member comprising:
an annular member having a base portion adapted to engage a lower portion of said housing,
a flexible wall portion extending from said base portion,
and an enlarged outer edge portion integrally formed with said wall portion, said outer edge portion being adapted to frictionally engage said upper surface of said platen to thereby frictionally limit the rotational speed of said platen to a predetermined maximum speed when said platen is lifted off of said work surface.

13. The sander of claim 12, wherein said braking member is formed from polyester butylene terephthalate and doped with silicon and teflon.

14. The sander of claim 13, wherein said doping comprises approximately two percent silicon and approximately fifteen percent teflon.

15. The sander of claim 12, wherein said predetermined maximum speed is approximately equal to 1200 rpm.

16. The sander of claim 12, wherein said upper surface of said platen includes a metallic ring secured thereto upon which said outer edge portion of said braking member rides during rotation of said platen.

17. The sander of claim 12, wherein said braking member is further adapted to seal the axial space between the lower surface of the housing and the upper surface of the platen.

18. The sander of claim 16 wherein said braking member provides a relatively constant spring force of approximately 3.5 lbs. against said upper surface of said platen.

19. The sander of claim 12 wherein said flexible wall portion of said brake member permanently deforms after an initial period of use of said sander.

* * * * *